United States Patent [19]

Hamada et al.

[11] Patent Number: 4,645,232
[45] Date of Patent: Feb. 24, 1987

[54] THREE-POINT TYPE SEATBELT SYSTEM FOR VEHICLE

[75] Inventors: Hideki Hamada; Tsutomu Shimizu, both of Aichi, Japan

[73] Assignees: Toyoto Jidosha Kabushiki Kaisha; Kabushiki Kaisha Tokai-Rika-Denki-Seisakusho, both of Japan

[21] Appl. No.: 817,486

[22] Filed: Jan. 9, 1986

[51] Int. Cl.⁴ .............................................. B60R 21/02
[52] U.S. Cl. ..................................... 280/801; 280/808
[58] Field of Search ............... 280/801, 802, 805, 807, 280/808; 297/467

[56] References Cited

U.S. PATENT DOCUMENTS 4,272,104  6/1981  Cuny ................................ 280/808 X
4,345,780  8/1982  Moriya et al. ................... 280/808 X

FOREIGN PATENT DOCUMENTS 56-49788  5/1981  Japan .
59-49851  3/1984  Japan .

Primary Examiner—John A. Pekar
Attorney, Agent, or Firm—Finnegan, Henderson, Farabow, Garrett & Dunner

[57] ABSTRACT

A three-point type seatbelt system includes a pivotal anchor plate having one end thereof pivotally connected to a side portion in the upper part of a vehicle body by a mounting bolt and the other end thereof provided with an engagement device for disengageably connecting a three-point type seatbelt which has one end thereof provided with an engagement member disengageably fitted to the engagement device and the other end thereof secured to a lower portion of the vehicle body. The system further includes a cam plate clamped between the anchor plate and the vehicle body, retaining or stopper means, such as a pawl, for preventing the cam plate from pivoting about the mounting bolt; and a leaf spring having one end thereof secured to the anchor plate and the other end thereof selectively engaging with engagement projections formed on the cam plate. When the anchor plate is pivoted about the mounting bolt to two positions, that is, an operative position and a housed position, the second end of the leaf spring which pivots together with the anchor plate selectively engages with the engagement projections of the cam plate.

14 Claims, 14 Drawing Figures

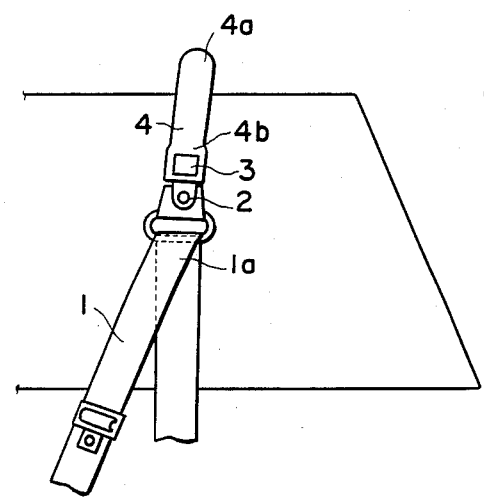
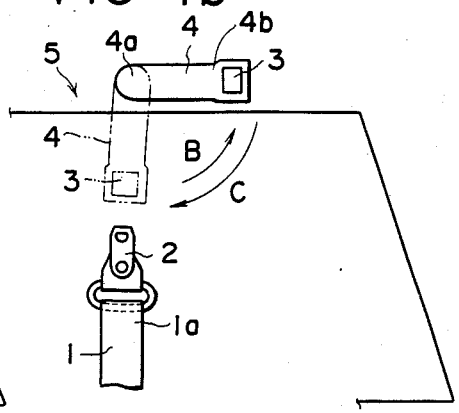
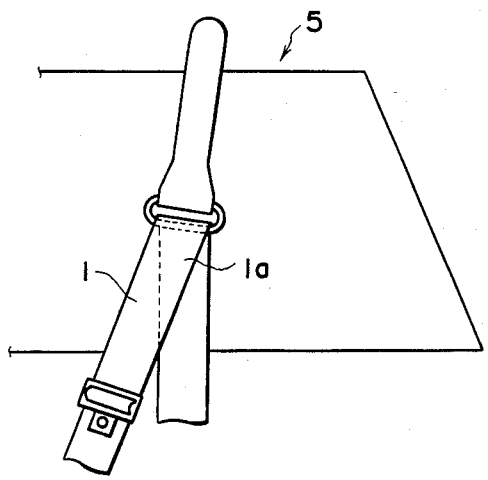

FIG-7a
PRIOR ART
FIG-7b
PRIOR ART
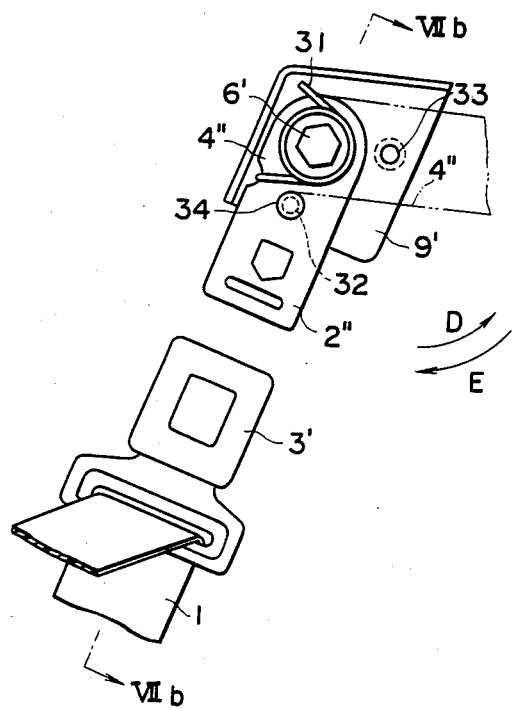
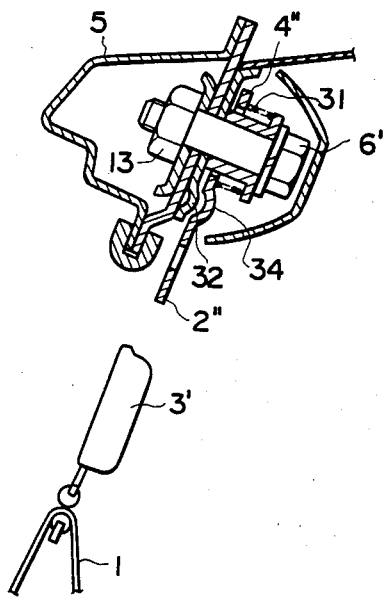

THREE-POINT TYPE SEATBELT SYSTEM FOR VEHICLE

BACKGROUND OF THE INVENTION

1. Field of the Invention

The present invention relates to a structure for mounting a three-point type seatbelt for a vehicle.

2. Description of the Related Art

One sort of conventional three-point type seatbelt system is so designed that one end portion 1a of a seatbelt 1 is fixed and cannot be disengaged from a side portion 5 in the upper part of the vehicle body of a pillar-less type four- or two-door car, as shown in FIG. 5, even when the front passenger's seat is unoccupied. This type of seatbelt system therfore obstructs the driver's side view, as well as that of any occupant seated in the back seat, while also marring the appearance of the car and making the occupants feel uncomfortable.

In order to overcome the above disadvantage, a disengageable three-point type seatbelt system has already been proposed, such as that shown in FIGS. 6a to 6d.

This seatbelt system employs the "Apparatus for Housing Engaging Support Member of Three-Point Type Seatbelt" disposed in the specification of Japanese Utility Model Application No. 49851/1984 which has been filed for patent by the applicant of the present invention. In this seatbelt system, an engaging support member 4' of a three-point type seatbelt 1 has one end 4a thereof pivotally connected to a roof side rail 5 through a ceiling member 24 and has a tongue receiving port 25 formed at the other end 4b. The support member 4' is mounted such that when the seatbelt 1 is out of use, the support member 4' is pivoted about the end 4a so that the axis of the member 4' is substantially parallel with the plane of the roof 26. The seatbelt 1 is housed in a body side member 27 and has a tongue plate 2' for insertion into the tongue receiving port 25 formed at the end 4b of the support member 4', the tongue plate 2' being slidably engaged with the intermediate portion of the seatbelt 1a. One end 1b of the seatbelt 1 is wound into a retractor 28, while the other end is secured to a floor member of the vehicle. A recess is formed in a side portion 29 of the ceiling member 24 which is closer to the roof side rail 5 so that the recess extends substantially parallel with a side surface 50 of the rail 5. A closure portion 30 for closing the tongue receiving port 25 of the support member 4' is formed at the rear end of the recess.

There has also been proposed one type of structure for mounting a three-point type seatbelt for a vehicle wherein when the seatbelt is out of use, the engaging support member 4' is accommodated in or drawn close to the roof side rail 5 in the upper part of the vehicle body, while the seatbelt 1 is accommmodated in or drawn close to the nearest door or the vehicle body, thereby enlarging the usable space within the vehicle when the seatbelt 1 is out of use, and improving the visibility through the window as well as the external appearance. This type of mounting structure is arranged as shown in FIGS. 7a and 7b.

The illustrated arrangement is the "Three-Point Type Seatbelt for Vehicle" disclosed in the specification of Japanese Utility Model Publication No. 49788/1981, in which an anchor plate 4" is pivotally connected to a roof side rail 5 and a mounting bracket 9' secured thereto by means of a bolt 6' and a weld nut 13. The anchor plate 4" is biased so as to pivot in the direction of the arrow D shown in FIG. 7a by means of a coil spring 31. Further, a tongue 2" which serves as a fitting member is formed directly at the distal end portion of the anchor plate 4", and the tongue 2" is disengageably fitted to a buckle 3' provided on the seatbelt 1.

The bracket 9' is provided with embossed convex portions 32, 33 at two positions, respectively, while the anchor plate 4" is provided with a concave portion 34 which selectively engages with the convex portions 32, 33. The convex and concave portions 32, 33 and 34 in combination serve as means for positioning the anchor plate 4" at two extremities of its pivoting motion so that the anchor plate 4" is allowed to pivot through about 110°, as shown by the solid line and the broken line in FIG. 7a.

When the seatbelt 1 is to be used, the concave portion 34 of the anchor plate 4" placed in the broken-line position is disengaged from the convex portion 33 against the force of the coil spring 31, and the anchor plate 4" is pivoted in the direction of the arrow E so that it reaches the solid-line position and the concave portion 34 engages with the convex portion 32 so as to be retained thereby. When, in this state, the anchor plate 4" is slightly moved in the direction of the arrow E so that the concave portion 34 is disengaged from the convex portion 32, the anchor plate 4" is pivoted through about 110° in the direction of the arrow D by the action of the coil spring 31, so that the concave portion 34 engages with the convex portion 33, and the anchor plate 4' is thereby fixed. In this way, the anchor plate 4" pivots upwardly from the window portion of the vehicle as shown by the arrow D and reaches the housed position shown by the broken line.

Thus, when the seatbelt 1 is out of use, it is completely withdrawn from the range of view defined by the window. It is therefore possible to provide a satisfactory side view for the occupant of the back seat, ensuring his comfort and ease of mind. Additionally, in the case of a two-door car, no obstruction is caused for the occupant when entering and leaving the vehicle.

However, with the structure of the prior art shown in FIGS. 6a to 6d, it is not possible for the occupant to feel the registration of the engaging support member 4' at the relevant positions where it is accommodated when pivoted to the two desired locations shown by the broken line and the solid line in the drawing.

In the prior art shown in FIGS. 7a and 7b, although the embossed convex portions 32, 33 are provided on the mounting bracket 9', and the concave portion 34 provided on the anchor plate 4" is selectively engaged with the convex portions 32, 33, it is still impossible for the occupant to feel any recognizable registration when he pivots the anchor plate 4" to the solid-line and broken-line positions, which fact inevitably involves inferior operability. In addition, when the anchor plate 4", which constitutes a cant rail, is pivoted about the bolt 6' in the direction of the arrow E shown in FIG. 7a to the solid-line position, it is not possible to reliably stop the anchor plate 4" from pivoting beyond the solid-line position in the direction of the arrow E toward the front end of the vehicle solely by means of the selective engagement between the concave portion 34 provided on the anchor plate 4" and the convex portions 32, 33 provided on the bracket 9'. Accordingly, an appropriate stop mechanism is required to enable the seatbelt 1 to be effectively used and fitted the body of the occupant in an optimum condition.

SUMMARY OF THE INVENTION

In view of the above circumstances, it is a primary object of the present invention to provide a three-point type seatbelt system provided with retaining means for making it possible to easily and reliably make engagement and disengagement between a disengageable three-point type seatbelt and an anchor plate which constitutes a connecting member (cant rail) and which is pivotally connected to an upper side portion of a vehicle body, to accommodate the anchor plate in a satisfactory condition, and to prevent the anchor plate from excessively pivoting toward the front end of the vehicle beyond a predetermined position in its pivoting movement.

To this end, the present invention provides a three-point type seatbelt system in which a leaf spring which pivots together with an anchor plate pivotally connected to a side portion in the upper part of a vehicle body is selectively engaged with engagement projections provided on a cam plate secured to the upper side portion through retaining means.

More specifically, the three-point type seatbelt system includes, as shown in FIG. 1, a pivotal anchor plate 4 which constitutes a connector and which has one end 4a thereof pivotally connected to a side portion in the upper part of a vehicle body by a mounting bolt 6 and the other end 4b provided with an engagement device 3 for disengageably connecting a three-point type seatbelt 1 which has one end 1a thereof provided with an engagement member 2 which is disengageably fitted to the engagement device 3 and the other end of the seatbelt 1 secured to a lower portion of the vehicle body. The seatbelt system is further provided with: a cam plate 9 clamped between the anchor plate 4 and the vehicle body by means of the bolt 6; retaining or stopper means S, such as a pawl 91, for preventing the cam plate 9 from pivoting about the bolt 6; and a leaf spring 14 having one end 14a thereof secured to the anchor plate 4 and the other end 14b selectively engaging with engagement projections 17, 18 formed on the cam plate 19, whereby when the anchor plate 4 is selectively pivoted about the bolt 6 to two positions, that is, operative and housed positions, the end 14b of the leaf spring 14, which pivots together with the anchor plate 4, selectively engages with the engagement projections 17, 18 of the cam plate 9.

With the above means, regardless of whether the sealtbelt 1 is in or out of use, the anchor plate 4 pivotally connected to a side portion 5 in the upper part of the vehicle body is selectively engaged with the engagement projections 17, 18 of the cam plate 9 secured to the side portion 5 by the action of the leaf spring 14. It is therefore possible for the occupant to positively feel the registration when he pivots the anchor plate 4 to the two desired positions in its pivoting movement, and this leads to superior operability.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIGS. 1 to 4b show in combination one embodiment of the disengageable three-point type seatbelt system according to the present invention, of which:

FIG. 1 is an exploded perspective view of an essential portion of the embodiment;

FIG. 2b is a side elevation of the connector as viewed from the direction indicated by the arrow IIb in FIG. 2a;

FIG. 2c is a plan view of the connector as viewed from the direction indicated by the arrow IIc in FIG. 2a;

FIG. 3 is a front elevational view of the connector when housed;

FIG. 4a shows the disengageable three-point type seatbelt in use; and

FIG. 4b shows the seatbelt and the connector when they are housed.

FIGS. 5 to 7b show prior arts, of which:

FIG. 5 shows a non-disengageable three-point type seatbelt in use;

FIG. 6b is a sectional view taken along the line VIb—VIb of FIG. 6a;

FIG. 6c is a sectional view taken along the line VIc—VIc of FIG. 6a;

FIG. 7a is a side view of an essential portion of another conventional disengageable three-point type seatbelt system; and FIG. 7b is a sectional view taken along the line VIIb—VIIb of FIG. 7a.

DESCRIPTION OF THE PREFERRED EMBODIMENT

One embodiment of the disengageable three-point type seatbelt system according to the present invention will be described below with reference to FIGS. 1 to 4b.

Figure 1:
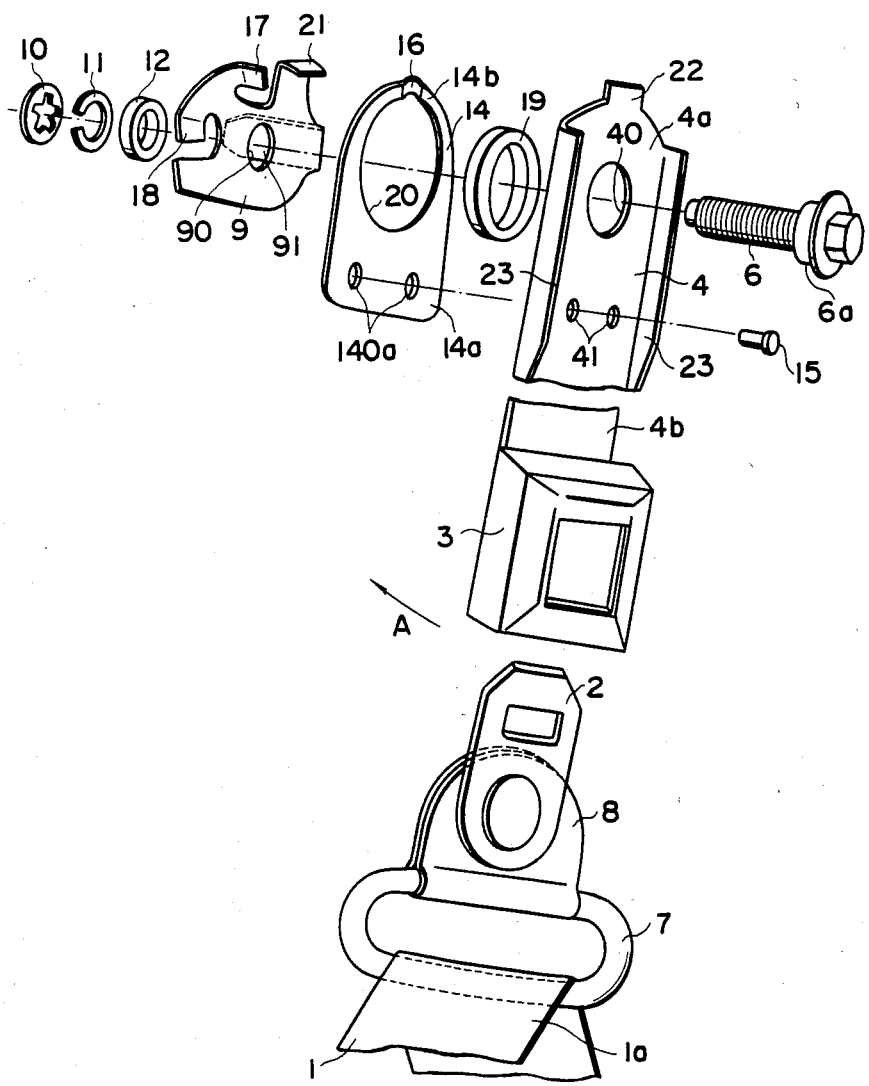

As shown in FIGS. 4a and 4b, an engagement member (tongue plate) 2 is slidably engaged with the intermediate portion 1a of a three-point type seatbelt 1. An anchor plate 4 has an engagement device (buckle) 3 to which the tongue plate 2 is disengageably fitted. One end 4a of the anchor plate 4 is pivotally connected to a side portion 5 in the upper part of a vehicle body. The anchor plate 4 constitutes a connector (cant rail) for disengageably connecting the seatbelt 1. As shown in FIG. 1 in detail, the anchor plate 4 is pivotally connected to the side portion 5 shown in FIGS. 2b by inserting the stepped portion 6a of a mounting bolt 6 through a bolt receiving bore 40 provided in the anchor plate 4. The buckle 3 is provided at the other end 4b of the anchor plate 4.

Figure 6A:
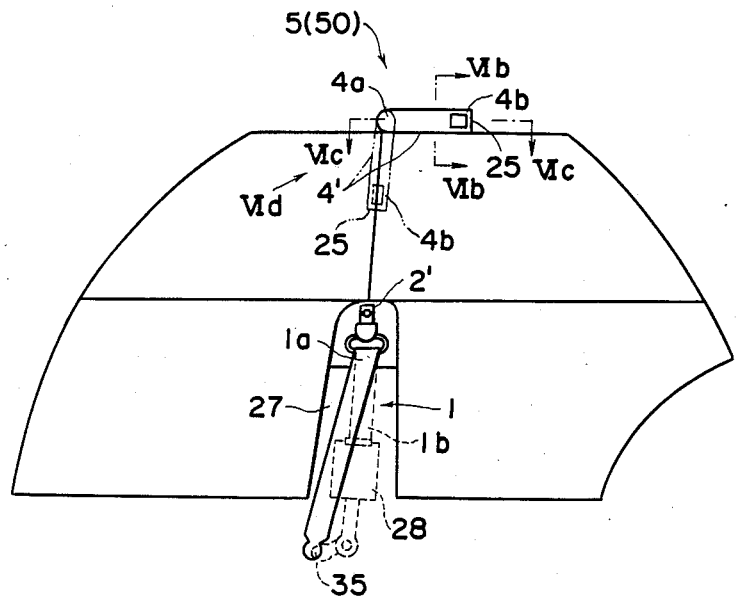
FIG. 6a is a side view of a conventional disengageable three-point type seatbelt system.
Figure 6B:
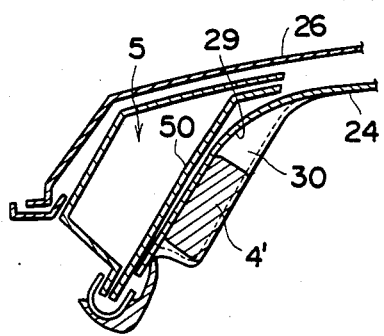
Figure 6C:
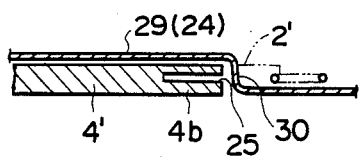
Figure 6D:
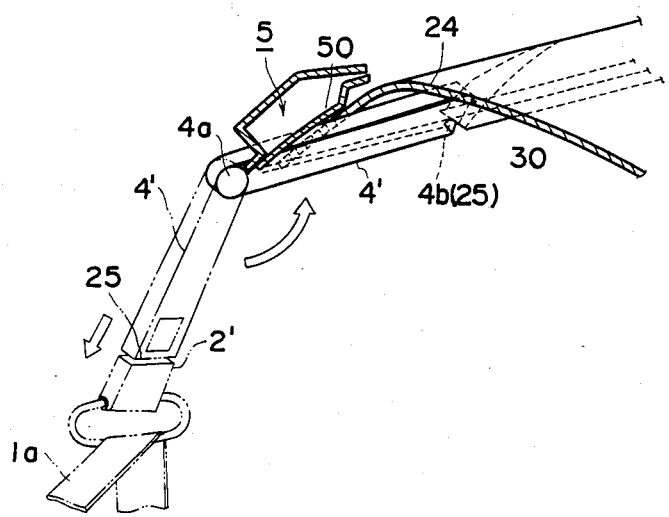
FIG. 6d is a perspective view of a portion of the seatbelt system shown in FIG. 6a indicated by the arrow VId.

The tongue plate 2 is, as shown in FIG. 1 in detail, connected to the intermediate portion 1a of the seatbelt 1 through a slip joint 7 and a connecting plate 8 fitted on the slip joint 7. One end of the seatbelt 1 is wound into a retractor 28 secured to, for example, a lower portion of the vehicle body, as shown in FIG. 6a. The other end of the seatbelt 1 is secured to a member (not shown) provided in the lower part of the vehicle body at a portion thereof denoted by a reference numeral 35 in FIG. 6a.

Figure 2A:
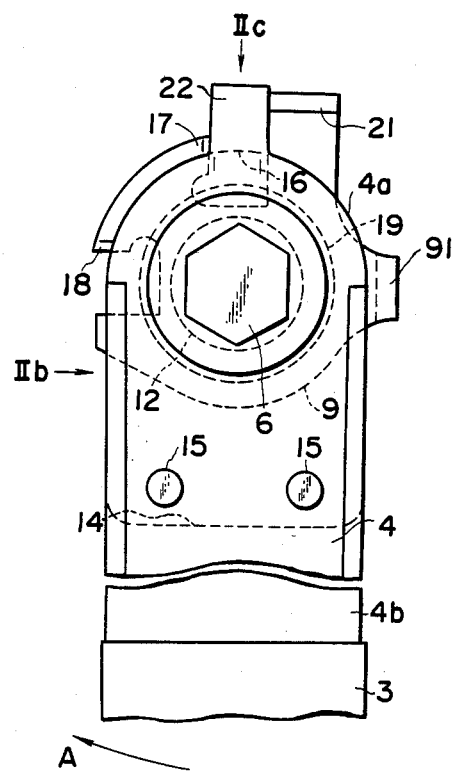
FIG. 2a is a front elevational view of the connector (cant rail) shown in FIG. 1, which illustrates the way in which the connector is pivoted when the seatbelt is in use.
Figure 2B:
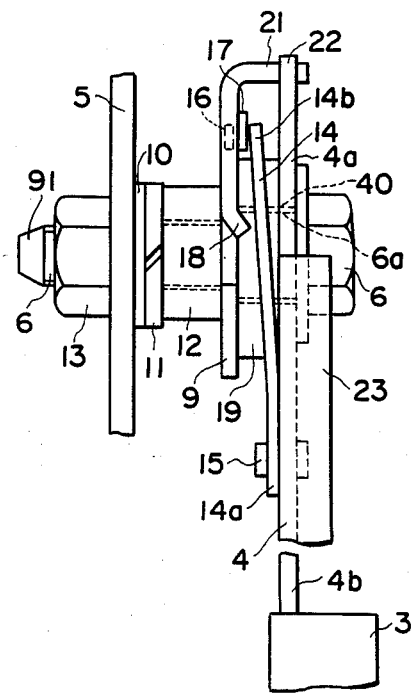

As shown in FIG. 2b, a cam plate 9 is clamped between the anchor plate 4 and the vehicle body using the bolt 6 which is also employed to secure the anchor plate 4 to the side portion 5. More specifically, the cam plate 9 is, as shown in FIGS. 1 and 2b, secured to the side portion 5 by inserting the bolt 6 through a bolt receiving bore 90 provided therein through a washer 10 with internal pawls, a spring washer 11 and a spacer 12 made of, for example, a metal. The bolt 6 is screwed into a weld nut 13 secured to the side portion 5 by welding and is tightened.

Figure 2C:
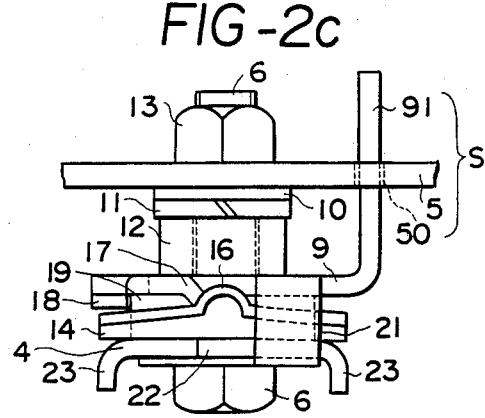

The cam plate 9 is provided with a pawl 91 (retaining or stopper means S) for preventing the cam plate 9 from pivoting about the bolt 6, the pawl 91 being inserted into a bore 50 (stopper means S) provided in the side portion 5, as shown in FIG. 2c.

Although the stopper means S is constituted by the combination of the pawl 91 provided on the cam plate 9 and the bore 50 provided in the side portion 5 in this embodiment, the stopper means S may be constituted by a combination of a pin formed on either the cam plate 9 or the side protion 5 and a bore which is provided in the other and with which the pin engages.

The anchor plate 4 is provided with bore 41, while the leaf spring 14 is provided with bores 140a at one end 14a thereof. The leaf spring 14 and the anchor plate 4 are secured together by caulking the heads of rivets 15 which are received through the bores 41, 140a, respectively. A convex portion 16 is formed at the other end 14b of the leaf spring 14. In addition, the leaf spring 14 is bent at an intermediate portion thereof close to the end 14a so that the other end 14b of the leaf spring 14 is disposed close to the cam plate 19, as shown in FIG. 2b.

Figure 3:
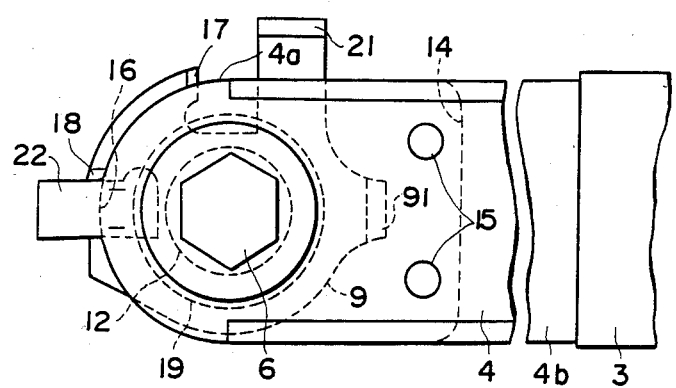

Thus, the leaf spring 14 is mounted so as to be hidden behind the anchor plate 4, and the convex portion 16 which is formed at the end 14b of the leaf spring 14 is selectively and resiliently engaged with two engagement projections 17, 18 formed on the cam plate 9, as shown in FIG. 2a which illustrates these constituent elements when the seatbelt 1 is in use, or as shown in FIG. 3 which illustrates the elements when the anchor plate 4 is housed, whereby it is possible to stop the anchor plate 4 at the two desired locations illustrated while making the occupant feel recognizable registration when pivoting the anchor plate 4.

It is to be noted that a resin spacer 19 is, as shown in FIGS. 1 and 2b, interposed between the cam plate 9 and the anchor plate 4 for the purpose of preventing chattering of the anchor plate 4. The leaf spring 14, which is disposed between the cam plate 9 and the anchor plate 4, is provided with a bore 20, as shown in FIG. 1, which has a slightly larger diameter than the outer diameter of the spacer 19 so that the spacer 19 can be smoothly received through the bore 20.

Further, a portion of the cam plate 9 is bent so as to provide a stopper flange 21 which extends towards the anchor plate 4. A stopper projection 22 is formed at the end 4a of the anchor plate 4. When the seatbelt 1 is in use (see FIG. 4a) with the tongue plate 2 latched by the buckle 3, the stopper projection 22 abuts against the stopper flange 21, as shown in FIG. 2a. The anchor plate 4 is prevented from pivoting in the direction of the arrow A shown in FIG. 2a by the buckle 3 provided at the end 4b of the anchor plate 4 in cooperation with the stopper means S (e.g., a combination of the pawl 91 of the cam plate 9 and the bore 50 provided in the side portion 5 in the upper part of the vehicle body), shown in FIG. 2c, for preventing the cam plate 9 from pivoting about the bolt 6 in the direction of the arrow A (shown in FIG. 2a). In consequence, the anchor plate 4 is disposed so as to extend along the parting portion between the front window glass and the rear window glass, whereby it is possible to improve the external appearance of the vehicle when the seatbelt 1 is out of use and enable the seatbelt 1 to be effectively used and fitted to the body of the occupant in an optimum condition.

It is to be noted that reinforcing flanges 23 are respectively formed at the lateral edges of the anchor plate 4.

When the anchor plate 4 in the state shown in FIG. 2a is to be housed, the buckle 3 and the tongue plate 2 are disengaged from each other as shown in FIG. 4b, and the anchor plate 4 shown by the broken line is pivoted in the direction of the arrow B so as to be housed as shown by the solid line, thus providing a satisfactory side view through the window.

At this time, the convex portion 16 of the leaf spring 14 in the state shown in FIG. 2a rides over the engagement projection 17 of the cam plate 9, and consequently, the leaf spring 14, together with the anchor plate 4, pivots counterclockwise. Thus, the convex portion 16 rides over the other engagement projection 18 of the cam plate 9 and is resiliently engaged with the engagement portion 18 as shown in FIG. 3, whereby the anchor plate 4 is set in its housed position as shown by the solid line in FIG. 4b.

It is necessary to appropriately set the magnitude of resilient force of the leaf spring 14 so that the anchor plate 4 housed as shown by the solid line in FIG. 4b is prevented from pivoting in the direction of the arrow C to the position shown by the broken line in response to vibrations occurring during running of the vehicle. However, at the same time, it is preferable to set the magnitude of resilient force of the leaf spring 14 which is required for the convex portion 16 to ride over the engagement projections 17 and 18 of the cam plate 9 so that the user or occupant can feel appropriate registration when pivoting the anchor plate 4 to the two desired locations.

As has been described above, the present invention is arranged such that a leaf spring, which pivots together with an anchor plate constituting a connector (cant rail), selectively engages with engagement projections provided on a cam plate. Therefore, an engagement device (buckle) provided on the anchor plate does not swing when the respective engagement projections of the leaf spring secured to the anchor plate and the cam plate are engaged with each other. For this reason, when an engagement member (tongue plate) connected to a three-point type seatbelt is engaged with the engagement device, it is only necessary for the occupant to hold the tongue plate, and he need not hold the buckle. Accordingly, it becomes possible for the occupant to make engagement and disengagement between the seatbelt and the anchor plate with one hand. In addition, it is possible for the occupant to feel recognizable registration when pivoting the anchor plate to a desired position, and the operability is greatly improved. Further, the anchor plate can be satisfactorily hidden when housed, whereby it is possible to more reliably enlarge the range of side view through the window when the front passenger's seat is unoccupied. When the three-point type seatbelt with the tongue plate latched by the buckle is in use, even if a force acts on the anchor plate so as to excessively pivot toward the front end of the vehicle, the cam plate is restrained from pivoting about the mounting bolt by retaining or stopper means, and the anchor plate is consequently stopped from pivoting toward the front end of the vehicle. Accordingly, it is possible for the seatbelt to be more effectively used and fitted to the body of the occupant in a greatly improved condition. In addition, it is possible for the cam plate to be readily and accurately mounted on the vehicle body.

What is claimed is;

1. A three-point type seatbelt system for a vehicle, comprising:
   an anchor plate having one end thereof pivotally connected to a side portion in the upper part of a vehicle body by means of a mounting bolt and the other end thereof provided with an engagement device for disengageably connecting a three-point type seatbelt;
   said seatbelt having one end thereof provided with an engagement member which is disengageably fitted to said engagement device and the other end thereof secured to a lower portion of the vehicle body;
   a cam plate clamped between said anchor plate and the vehicle body;
   retaining means for preventing said cam plate from pivoting about said mounting bolt; and
   a leaf spring having one end thereof secured to said anchor plate and the other end thereof selectively engaging with engagement projections formed on said cam plate,
   whereby when said anchor plate is pivoted about said mounting bolt to two positions, that is, an operative position and a housed position, said other or second end of said leaf spring, which pivots together with said anchor plate, selectively engages with the engagement projections of said cam plate.

2. A three-point type seatbelt system according to claim 1, wherein said anchor plate, said leaf spring and said cam plate have respective bores for coaxially receiving said mounting bolt.

3. A three-point type seatbelt system according to claim 1, wherein said engagement device provided on said anchor plate is a buckle having a latch mechanism, while said engagement member provided on said seatbelt is a tongue plate which is inserted into said buckle so as to be retained thereby.

4. A three-point type seatbelt system according to claim 1, wherein said engagement member is slidably provided on the intermediate portion of said seatbelt.

5. A three-point type seatbelt system according to claim 1, wherein said retaining means comprises a pin formed on either said cam plate or said side portion in the upper part of the vehicle body, and a bore which is formed in the other and with which said pin engages.

6. A three-point type seatbelt system according to claim 1, wherein said retaining means comprises a pawl provided on said cam plate, and a bore which is provided in said side portion in the upper part of the vehicle body and into which said pawl is inserted for the purpose of preventing said cam plate from pivoting about said mounting bolt.

7. A three-point type seatbelt system according to claim 1, wherein said second end of said leaf spring has a convex portion for selective engagement with said engagement projections of said cam plate.

8. A three-point type seatbelt system according to claim 1, wherein said leaf spring is bent at an intermediate portion close to said first end thereof secured to said anchor plate so that said second end is disposed close to said cam plate.

9. A three-point type seatbelt system according to claim 1, wherein said leaf spring is mounted so as to be hidden behind said anchor plate.

10. A three-point type seatbelt system according to claim 1, wherein a resin spacer is interposed between said cam plate and said anchor plate for the purpose of preventing chattering of said anchor plate.

11. A three-point type seatbelt system according to claim 10, wherein said resin spacer is formed such as to have an annular configuration, said bore of said leaf spring between said cam plate and said anchor plate having a diameter larger than the outer diameter of said spacer so that said bore receives said spacer with an appropriate clearance or play.

12. A three-point type seatbelt system according to claim 1, further comprising a stopper mechanism provided at said operative position of said anchor plate for positioning said anchor plate with respect to said cam plate.

13. A three-point type seatbelt system according to claim 1, wherein said operative position of said anchor plate is a position at which said anchor plate extends substantially downward from said mounting bolt, while said housed position is a position at which said anchor plate extends substantially parallel with the longitudinal axis of the vehicle after said anchor plate has pivoted about said mounting bolt.

14. A three-point type seatbelt system for a vehicle, comprising:
   a side portion in the upper part of the vehicle body, said side portion having a retaining bore;
   a cam plate secured to said side portion and having a pawl retained by said retaining bore so as to prevent said cam plate from pivoting, at least two engagement projections, and a mounting bolt receiving bore provided at a substantially central position on said cam plate;
   an anchor plate pivotally mounted on said plate through a spacer and having one end thereof provided with a mounting bolt receiving bore and the other end thereof provided with an engagement device for disengageably connecting a three-point type seatbelt;
   a mounting bolt received through the respective mounting bolt receiving bores of said anchor plate and said cam plate and secured to said side portion in the upper part of the vehicle body, thereby clamping said cam plate between the vehicle body and said anchor plate and supporting said anchor plate so as to be pivotal about said mounting bolt;
   a leaf spring positioned between said anchor plate and said cam plate and having, at least, a mounting bolt receiving bore for receiving said mounting bolt, one end of said leaf spring being secured to said anchor plate so that said leaf spring is pivotal together with said anchor plate, the other end of said leaf spring having a convex portion which selectively and resiliently engages with the two engagement projections of said cam plate, and said leaf spring enabling said anchor plate to be selectively positioned at two positions respectively corresponding to positions at which said convex portion engages with said two engagement projections while making the user or occupant feel recognizable registration when pivoting said anchor plate to said two positions; and
   connecting means having an engagement member disengageably fitted to the engagement device of said anchor plate, and slidably connected to the intermediate portion of said seatbelt.

* * * * *